United States Patent
Dumas et al.

(10) Patent No.: US 8,059,917 B2
(45) Date of Patent: Nov. 15, 2011

(54) 3-D MODELING

(75) Inventors: Olivier Dumas, Saint Ambroix (FR);
Renaud Seguier, Acigne (FR);
Sebastien De Gregorio, Nice (FR)

(73) Assignee: Texas Instruments Incorporated, Dallas, TX (US)

( * ) Notice: Subject to any disclaimer, the term of this patent is extended or adjusted under 35 U.S.C. 154(b) by 1019 days.

(21) Appl. No.: 11/862,399

(22) Filed: Sep. 27, 2007

(65) Prior Publication Data

US 2008/0267449 A1 Oct. 30, 2008

(30) Foreign Application Priority Data

Apr. 30, 2007 (EP) .................................... 07290537

(51) Int. Cl.
*G06K 9/32* (2006.01)
(52) U.S. Cl. ...................................................... 382/294
(58) Field of Classification Search .................. 382/209, 382/285, 286, 289, 294, 305; 345/419, 420, 345/582, 619
See application file for complete search history.

(56) References Cited

U.S. PATENT DOCUMENTS

| | | | | |
|---|---|---|---|---|
| 6,072,496 A * | 6/2000 | Guenter et al. | ............... | 345/419 |
| 6,208,347 B1 * | 3/2001 | Migdal et al. | ................. | 345/419 |
| 6,532,011 B1 * | 3/2003 | Francini et al. | ............... | 345/420 |
| 6,549,200 B1 * | 4/2003 | Mortlock et al. | ............. | 345/419 |
| 7,103,211 B1 * | 9/2006 | Medioni et al. | .............. | 382/154 |
| 7,657,083 B2 * | 2/2010 | Parr et al. | ...................... | 382/155 |
| 2005/0053275 A1 * | 3/2005 | Stokes | .......................... | 382/154 |
| 2005/0062737 A1 * | 3/2005 | Wang et al. | .................. | 345/419 |
| 2005/0063582 A1 * | 3/2005 | Park et al. | ..................... | 382/154 |

* cited by examiner

*Primary Examiner* — Jason M Repko
*Assistant Examiner* — Shervin Nakhjavan
(74) *Attorney, Agent, or Firm* — Ronald O. Neerings; Wade James Brady, III; Frederick J. Telecky, Jr.

(57) ABSTRACT

A system comprising an imaging device adapted to capture images of a target object at multiple angles. The system also comprises storage coupled to the imaging device and adapted to store a generic model of the target object. The system further comprises processing logic coupled to the imaging device and adapted to perform an iterative process by which the generic model is modified in accordance with the target object. During each iteration of the iterative process, the processing logic obtains structural and textural information associated with at least one of the captured images and modifies the generic model with the structural and textural information. The processing logic displays the generic model.

20 Claims, 7 Drawing Sheets

GENERIC MODEL 208

300
VERTICAL SUB-BANDS

GENERIC MODEL
208

FIG. 3

300
VERTICAL SUB-BANDS

3-D MODELING

CROSS-REFERENCE TO RELATED APPLICATIONS

This application claims priority to EPO Patent Application No. 07290537.5, filed on Apr. 30, 2007, incorporated herein by reference.

BACKGROUND

In electronic device modeling, images of a target object are captured and reproduced on the device's display in a three-dimensional (3-D) format. For example, "avatars" which resemble an end-user's face are often superimposed on 3-D video game characters. However, existing techniques for capturing images detailed enough to be used in such 3-D applications are financially expensive (due to the need for hardware, such as scanners), and are not user-friendly (because they require extensive interaction with the end-user).

SUMMARY

Accordingly, there are disclosed herein techniques by which a computer is enabled to perform user-friendly, financially-inexpensive 3-D modeling. An illustrative embodiment includes a system comprising an imaging device adapted to capture images of a target object at multiple angles. The system also comprises storage coupled to the imaging device and adapted to store a generic model of the target object. The system further comprises processing logic coupled to the imaging device and adapted to perform an iterative process by which the generic model is modified in accordance with the target object. During each iteration of the iterative process, the processing logic obtains structural and textural information associated with at least one of the captured images and modifies the generic model with the structural and textural information. The processing logic displays the generic model.

Another illustrative embodiment includes a process that comprises capturing an image of a target object and matching the image to one of a plurality of modified generic models, where each of the plurality of modified generic models is associated with a common generic model and is rotated to a different angle. The method also comprises rotating the common generic model to an angle associated with the one of the plurality of modified generic models. The method further comprises modifying the common generic model with structural and textural information associated with the image. The method still further comprises displaying the common generic model.

Yet another illustrative embodiment includes a system comprising means for capturing an image of a target object. The system also includes means for matching the image to one of a plurality of modified generic models, where each of the plurality of modified generic models is associated with a common generic model and rotated to a different angle. The system further comprises means for displaying the common generic model. The means for matching is also for rotating the common generic model to an angle associated with the one of the plurality of modified generic models. The means for matching is also for modifying the common generic model with structural and textural information associated with the image.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "generic model" may be used even after a "generic model" has been modified to resemble a target object. In some cases, the term "modified generic model" may be used for purposes of clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. For example, although various embodiments of the technique are described below in the context of facial modeling, the same techniques also may be applied or adapted to be applied to modeling of other parts of the human body, animals and/or inanimate objects.

Disclosed herein are various embodiments of a user-friendly, financially-inexpensive technique by which a computer (e.g., a personal computer (PC), a mobile communication device) may perform 3-D modeling. The technique involves capturing a series of images of a target object (e.g., an end-user's face, various other body parts, an animal, an inanimate object) from various angles and modifying a generic model of the target object in accordance with the series of images. For example, to perform 3-D head modeling, the computer may first generate a generic model of a human head. The computer may then capture a series of images of the computer user's head from various angles. The computer uses each captured image to modify, or "remodel," the generic model. In this way, the generic model is fashioned to resemble the user's head. The generic model, which now resembles the user's head, may be used in various applications (e.g., superimposition of the model on a video game character). The technique disclosed herein models target objects in real-time, uses a camera (e.g., a webcam or mobile communication device camera) as opposed to expensive scanner technology, and models target objects without requiring a user to manually select key points associated with the target object.

Figure 1A:
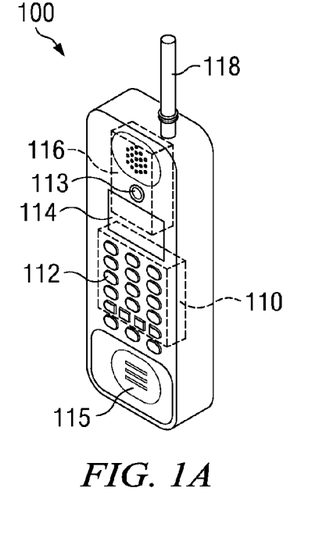
FIG. 1a shows an illustrative mobile communication device implementing the technique disclosed herein, in accordance with preferred embodiments of the invention.

Various embodiments of the technique described herein may be implemented in any suitable electronic device able to capture an image, such as a mobile communication device, a PC, etc. FIG. 1a shows an illustrative mobile communication device 100 implementing the technique in accordance with embodiments of the invention. The device 100 comprises a battery-operated device which includes an integrated keypad 112, an image-capturing device 113 (e.g., a camera), a display 114 and a microphone 115. The device 100 further includes an electronics package 110 coupled to the keypad 112, display 114, and radio frequency ("RF") circuitry 116. The electronics package 110 contains various electronic components used by the device 100, including processing logic, storage logic, etc. The RF circuitry 116 may couple to an antenna 118 by which data transmissions are sent and received. Although the mobile communication device 100 is represented as a mobile phone in FIG. 1, the scope of disclosure is not limited to mobile phones and also may include personal digital assistants (e.g., BLACKBERRY® or PALM® devices), multi-purpose audio devices (e.g., APPLE® iPHONE® devices), portable computers or any other mobile or non-mobile electronic device.

Figure 1B:
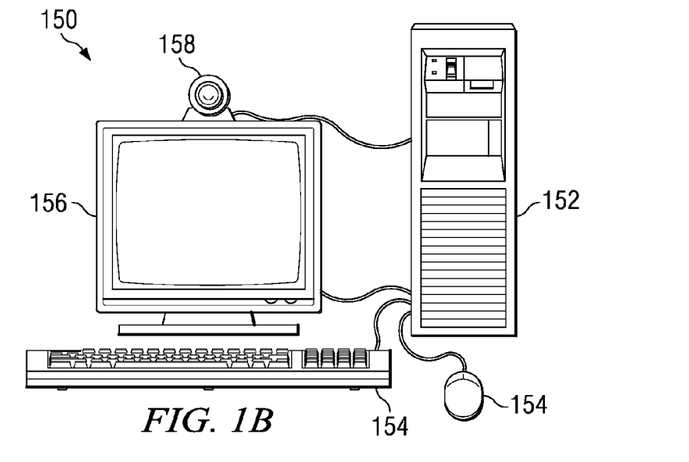
FIG. 1b shows an illustrative personal computer (PC) implementing the technique disclosed herein, in accordance with embodiments of the invention.

In at least some embodiments, devices other than mobile communication devices are used. For example, FIG. 1b shows an illustrative PC 150 capable of implementing the disclosed technique in accordance with various embodiments of the invention. The PC 150 comprises a tower 152, various input devices 154, a display 156 and an image-capturing device 158 (e.g., a webcam). The PC 150 may be communicatively coupled to a network, such as the Internet or a Local Area Network (LAN), through which the PC 150 may communicate with one or more other electronic devices. Although the various embodiments of the technique disclosed herein may be applied to all suitable types of electronic devices, the remainder of this discussion assumes the use of a mobile communication device such as the mobile communication device 100.

Figure 2:
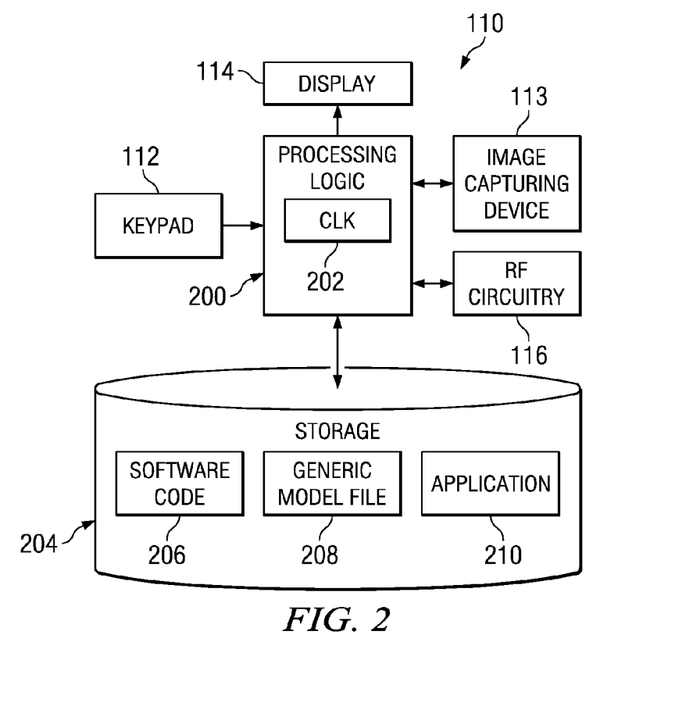
FIG. 2 shows an illustrative block diagram of at least some contents of the mobile communication device of FIG. 1, in accordance with preferred embodiments of the invention.

FIG. 2 shows an illustrative block diagram of at least some of the contents of the electronics package 110. The electronics package 110 comprises a processing logic 200 coupled to the display 114, the image-computing device 113, the RF circuitry 116, the keypad 112 and a storage 204. In turn, the storage 204 comprises software code 206, a generic model file 208 and an application 210. The software code 206 comprises code which, when executed by the processing logic 200, causes the processing logic 200 to perform the technique described herein. The generic model file 208 and the application 210 are described below. The processing logic 200 comprises a clock (CLK) 202 (e.g., with 32 kHz oscillation). Storage 204 may comprise a processor (computer)-readable medium such as random access memory (RAM), volatile storage such as read-only memory (ROM), a hard drive, flash memory, etc. or combinations thereof. Although storage 204 is represented in FIG. 2 as being a single storage unit, in some embodiments, the storage 204 comprises a plurality of discrete storage units.

In operation, the software code 206 preferably causes the processing logic 200 to generate the generic model file 208 prior to capturing images of a target object. The generic model file 208 is associated with a generic model (i.e., 3-D image). For purposes of this discussion, the terms "generic model" and "generic model file" are interchangeable. As described above, a generic model comprises a generic 3-D representation of the target object. For example, if a human head is to be modeled, the generic model 208 comprises a generic model of a human head. In another example, if the entire human body is to be modeled, the generic model 208 comprises a generic model of the human body. The target object may be non-human, also. For example, the target object may be an animal such as a dog, in which case the general model 208 may comprise a generic model of a dog. The target object may comprise inanimate objects, as well. For gaming purposes, the inanimate objects may comprise swords, guns, shields, clothes, etc. The scope of this disclosure is not restricted to any specific type of target object. However, for the sake of clarity and brevity, the remainder of this discussion assumes that the target object is a human head.

The type of generic model 208 used depends on the type of target object being used. In some embodiments, the user may indicate via the keypad 112 the type of target object being used. Once the user has indicated the type of target object being used, the processing logic 200 may update the generic model file 208 with a model that corresponds to the target object. The generic model 208 may be obtained in any suitable manner. In some embodiments, the generic model 208 may already be stored on the storage 204. In other embodiments, the generic model 208 may be obtained from a different electronic device using the RF circuitry 116 and the antenna 118. In yet other embodiments, the generic model 208 may be generated by the processing logic 200 using any suitable generic model generation technique, preferably a ray-tracing technique. Ray-tracing is described in detail in U.S. Pat. No. 7,126,605, titled, "Method and Apparatus for Implementing Level of Detail with Ray Tracing," incorporated herein by reference.

Figure 3:
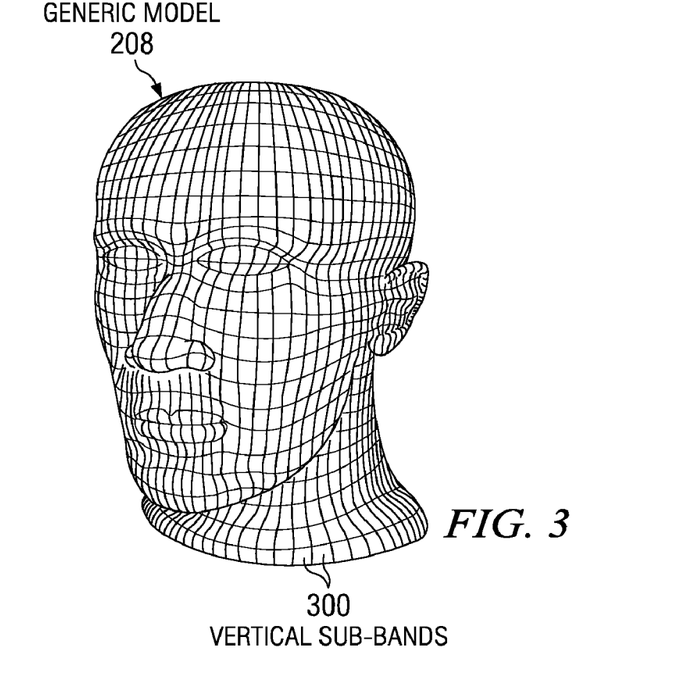
FIG. 3 shows an illustrative generic model of a human head, in accordance with embodiments of the invention.

An illustrative generic model 208 of the human head is shown in FIG. 3. The generic model 208 shown in FIG. 3 is a 3-D representation of a generic human head. One goal of the technique disclosed herein is to capture a series of images of the target object (in this case, the user's head) from various angles and to use those images to fashion the generic model 208 to resemble the end-user's head. To facilitate this remodeling of the generic model 208, the surface of the generic model 208 is partitioned into a plurality of vertically-oriented regions, called sub-bands 300. The contours of the sub-bands 300 determine the shape of the generic model 208. As described below, the technique involves capturing images of the end-user's head and using the captured images to modify one or more of the vertical sub-bands 300.

Once the generic model 208 has been obtained, the software code 206 causes the processing logic 200 to capture a baseline image of the end-user. Specifically, the processing logic 200 first requests the end-user to provide a baseline image. This request may be made using any suitable output device (e.g., the display 114). To enable the user to provide the baseline image, the processing logic 200 displays on the display 114 an initialization grid, such as the initialization grid 400 shown in FIG. 4a. The initialization grid 400 comprises a midline 402 and horizontal lines 404 and 406. The processing logic 200 requests the user to align the user's face with the grid 400 in a predetermined manner.

Figure 4A:
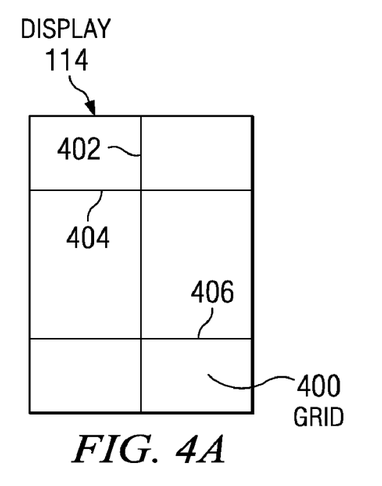
FIG. 4a shows an illustrative initialization grid, in accordance with embodiments of the invention.
Figure 4B:
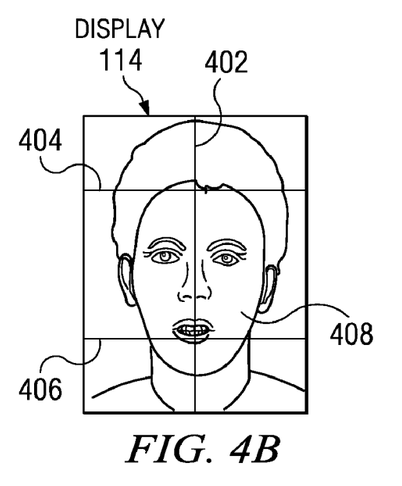
FIG. 4b shows an end-user face in alignment with the initialization grid of FIG. 4a, in accordance with embodiments of the invention.

In preferred embodiments, the processing logic 200 requests the user to align the vertical midline of the user's face (e.g., the vertical line along the user's nose and between the eyes) with the midline 402. Further, the processing logic 200 requests the user to align the horizontal line 404 with the user's eyebrows (e.g., the horizontal line along the user's brow). The processing logic 200 also requests the user to align the horizontal line 406 with the bottom of the user's chin. FIG. 4b shows an illustrative target object (i.e., a user) 408 aligning his face in accordance with preferred embodiments of the invention. To align the user's face in accordance with the processing logic's instructions, the user may adjust the distance between the user and the image capturing device 113 and/or move to the left or to the right, as necessary. Zoom features of the device 100 also may be used. To enable the user to align the user's face with the initialization grid 400, the image-capturing device 113 is activated to capture images in real-time (essentially, to capture a video stream) and to feed the images to the display 114 in real-time.

Once the user has aligned the user's face with the grid 400 as requested by the logic 200, the user may provide to the logic 200 a confirmation signal indicating that the user has complied with the logic's requests. The user provides this signal to the logic 200 using any suitable technique (e.g., using the keypad 112, providing an audible command via the microphone 115). Once the processing logic 200 receives a confirmation signal from the user, the software code 206 causes the processing logic 200 to capture the user's image and to store the image to storage 204. Because the user's image is in alignment with the grid 400, the processing logic 200 is provided with a "baseline" image with which to work.

Figure 5A:
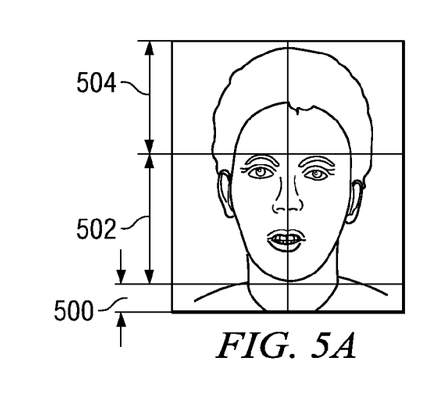
FIGS. 5a-5c show illustrative initialization techniques using a baseline image, in accordance with preferred embodiments of the invention.

Once captured, the baseline image is used to modify the generic model 208 so that the generic model 208 has an appearance as similar as possible to that of the baseline image. This initial modification is performed prior to intensive remodeling of the generic model 208 (described below) so that remodeling of the generic model 208 does not begin from "scratch" but from a generic model 208 which resembles the user's head to at least some degree. Referring to FIG. 5a, in performing this modification, the software code 206 causes the processing logic 200 to determine the distance 500 between the bottom of the image and the user's chin (i.e., the distance between the bottom of the image and the horizontal line 406). The code 206 also causes the processing logic 200 to determine the distance 502 between the bottom of the user's chin and the user's eyebrows (i.e., the distance between the horizontal lines 406 and 404). The code 206 further causes the processing logic 200 to determine the distance 504 between the user's eyebrows and the top of the image (i.e., the distance between the horizontal line 404 and the top of the image).

Figure 5B:
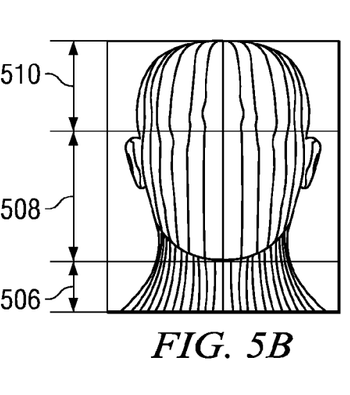

The software code 206 then causes the processing logic 200 to perform the same distance measurements for the generic model 208. As shown in FIG. 5b, the code 206 causes the logic 200 to determine the distance 506 between the bottom of the image and the model's chin, the distance 508 between the model's chin and the model's brow line, and the distance 510 between the model's brow line and the top of the image.

Figure 5C:
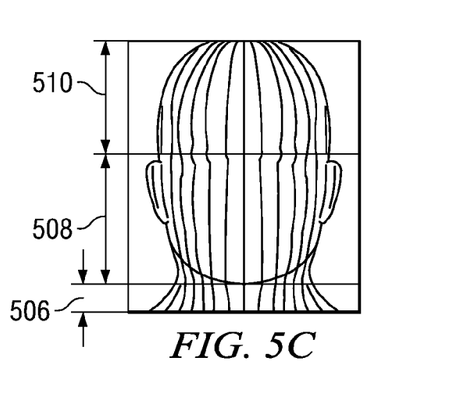

The code 206 then causes the processing logic 200 to compare the image of the user with the image of the generic model 208. Specifically, the logic 200 compares distances 500 and 506, distances 502 and 508, and distances 504 and 510. The logic 200 uses the results of these comparisons to modify the generic model 208 to more closely resemble the user's face. Comparing FIGS. 5b and 5c, the distance 506 has been decreased, the distance 508 has been kept substantially the same, and the distance 510 has been increased, all to modify the generic model 208 to more closely resemble the user's face. Modification of the generic model 208 is performed by adjusting the contours of the sub-bands 300 so that the positioning of features on the generic model 208 (e.g., eyebrows, lips, chin) more closely matches the positioning of features on the user's face. However, the scope of this disclosure is not limited to these initial modifications. Any suitable type of modification may be performed, including shrinking or enlarging the size of the generic model 208, adjusting the width or the height of the model 208, adjusting specific features, etc. The resulting baseline generic model 208 is stored to the generic model file 208.

Once the modified generic model 208 has undergone the initial modification using the baseline image, the software code 206 causes the processing logic 200 to begin an iterative algorithm by which the generic model 208 is repeatedly modified to more closely resemble the user's head. This algorithm comprises the "intensive remodeling" mentioned above. For the sake of brevity, only one iteration of the algorithm is described in detail, but it should be understood that the iteration may be performed as many times as desired to produce a modified generic model which resembles the target object.

Figure 6:
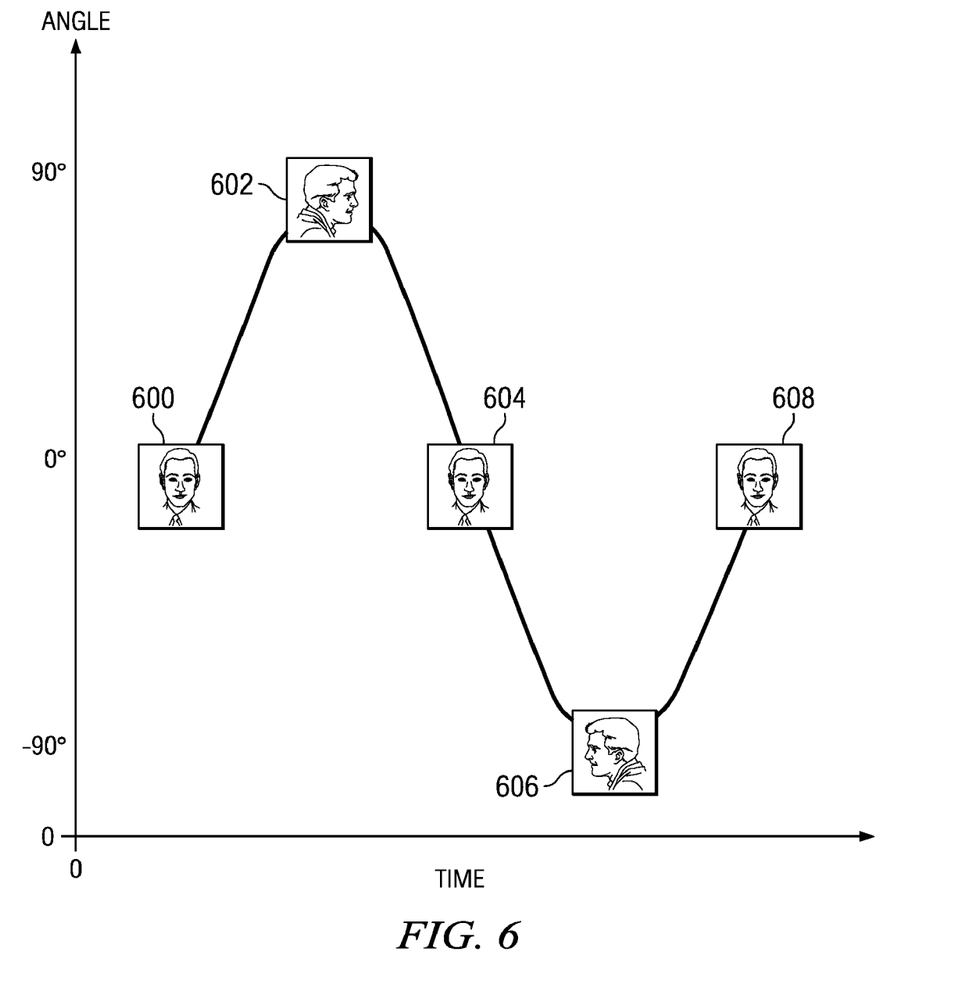
FIG. 6 shows an illustrative head rotation sequence, in accordance with preferred embodiments of the invention.

The iterative algorithm begins with the code 206 causing the processing logic 200 to request that the user perform a rotation of the user's head in a predetermined manner. Specifically, the logic 200 may display a request to the user (on display 114) requesting that the user first rotate the user's head 90 degrees in one direction, followed by a second rotation of the user's head 180 degrees in the opposite direction, followed by a third rotation of the user's head 90 degrees in the original direction. An illustrative head rotation sequence is shown in FIG. 6, although the scope of this disclosure is not limited to the specific sequence shown in FIG. 6. As shown in icon 600, the user begins by orienting his face directly at the camera. As shown in icon 602, the user then rotates his head 90 degrees to the user's left. As shown in icons 604 and 606, the user then rotates his head 180 degrees to the user's right. Icon 608 shows that the user then rotates his head 90 degrees to the left. The head rotation sequence is then complete. As shown in FIG. 6, these rotations are performed along the vertical axis defined by the user's neck.

A goal of this head rotation sequence is to capture a series of images of the user's head from multiple, predetermined angles. In some of the preferred embodiments, anywhere between 10 and 30 images are captured. In some of the preferred embodiments, at least 3 images are captured. The disclosed technique can capture images of the head at any or all angles, as opposed to capturing images of only 3 sides of the head. This series of images is used to repeatedly modify the generic model 208.

In some embodiments, the processing logic 200 begins capturing the series of images upon receipt of a signal by the user (e.g., a key pressed on the keypad 112). However, in preferred embodiments, the processing logic 200 begins capturing the series of images as soon as the logic 200 issues the request to the user that the user begin the head rotation sequence. The logic 200 preferably captures the images at intervals of approximately 33 milliseconds (e.g., using the CLK 202), although other time intervals may be used.

Figure 7:
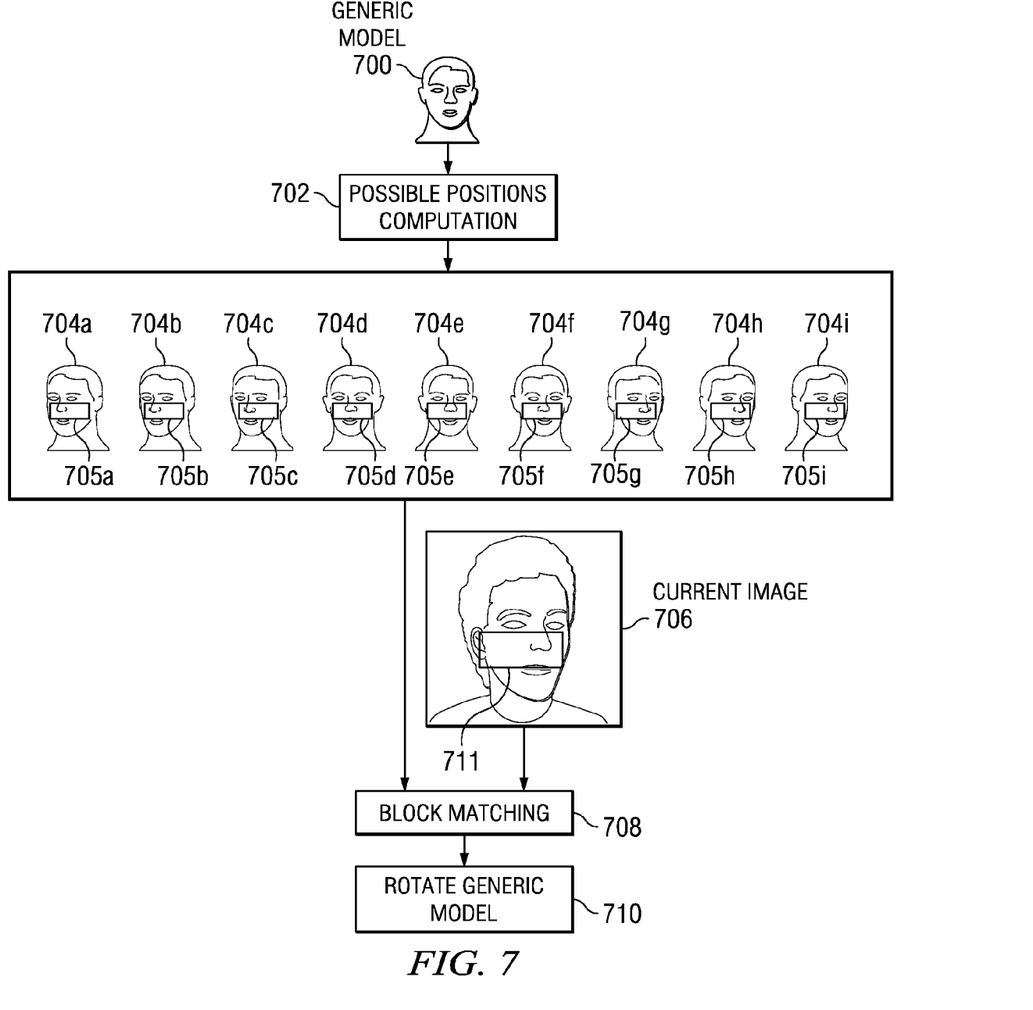
FIG. 7 shows a conceptual flow diagram of an iteration of the technique disclosed herein, in accordance with preferred embodiments of the invention.

Referring to FIG. 7, there is shown a conceptual flow diagram of at least part of the iterative algorithm used by the logic 200. Prior to capturing a new image in the series of images, the processing logic 200 uses the generic model 208 to generate a plurality of modified generic models. Each of the modified generic models is similar to the generic model 208, except it is rotated a maximum of n degrees to the left or to the right. For example, as shown in FIG. 7, the logic 200 uses the generic model 208 (indicated by numeral 700) to compute (numeral 702) a plurality of modified generic models (numerals 704a-704i). Model 704a shows the generic model 208 rotated n degrees to the right and model 704i shows the generic model 208 rotated n degrees to the left, where n is preferably 10 but may be any suitable number. Models 704b-704h are rotated fewer than n degrees to the right or the left, and model 704e is not rotated at all. Although nine modified generic models are shown, the scope of this disclosure is not limited to having any specific number of modified generic models.

For each image captured (indicated by numeral 706), the logic 200 compares the captured image to the plurality of modified generic models 704 to locate the modified model which most closely matches the captured image. The matching process may be performed using any suitable technique, but in preferred embodiments, the matching is performed using quadratic distance calculations using the eyebrows. Specifically, a predefined area is selected in the current image 706 (indicated by numeral 711) and an associated predefined area is also selected in each of the modified generic models (numerals 705a-705i). The quadratic distance between the areas defined by the rectangle 711 and each area defined by the rectangles 705a-705i is then calculated. The modified generic model (from 705a-705i) for which the quadratic distance is minimum is the matching one and gives the estimation of the angle of the face in the current image 706. Once a match is located (numeral 708), the generic model 208 is rotated to an angle which corresponds to the matching modified generic model 704 (numeral 710). The sub-bands 300 of the generic model 208 are then modified using information from the captured image. The sub-bands of the generic model 208 are modified as now described.

In preferred embodiments, modification of the generic model 208 in accordance with a captured image occurs in two phases. A first phase includes analysis of the captured image to determine the mesh of the captured image. By "mesh" determination, it is meant that the silhouette of the user, the angles and contours of the user's face (e.g., prominence and shape of nose, jaw, lips, eye sockets, cheekbones), and other structural features of the user's face are determined. The first phase also includes modification of the generic model 208 to more closely resemble the mesh of the captured image.

A second phase includes extracting "texture" information from the captured image. By "texture" extraction, it is meant that an actual image of the user—not the mesh structural features—is extracted. Examples of textural information include "flesh information" (e.g., skin information, eye information, color information) and "hair information" (e.g., hair style). An example distinguishing mesh information from texture information includes the generic model shown in FIG. 3. The generic model of FIG. 3 contains mesh information—generic contours, structural features, etc. of a human head. However, the generic model of FIG. 3 contains no texture information—for example, it lacks skin, hair, eyes, colors, etc. The second phase includes modification of the generic model 208 to include the texture information obtained in the second phase. By layering texture information "on top" of a generic model having accurate mesh (structural) features, a generic model is produced which resembles the target object.

In preferred embodiments, the first phase includes modification of some or all of the sub-bands of the generic model 208 in accordance with the captured image. Specifically, the processing logic 200 adjusts the contours of the sub-bands 300 in any of three dimensions in accordance with the mesh structural information of the captured image. However, in preferred embodiments, the second phase includes modification of only a portion of the texture of the generic model 208. Specifically, the second phase includes modification of only the sub-band 300 that coincides with a midline of the captured image. For example, if the user is directly facing the image-capturing device 113, the sub-band 300 along the nose of the generic model 208 would be updated using corresponding texture information from the captured image. However, if the user is facing 90 degrees to the user's left, the sub-band 300 corresponding to the right ear of the generic model 208 may be updated using corresponding texture information from the captured image. Although these techniques are implemented in some preferred embodiments, the scope of this disclosure is not limited to these specific techniques for collecting and applying mesh and texture information from a captured image to the generic model 208. Conceptual illustrations of the first and second phases are now provided.

Figure 8A:
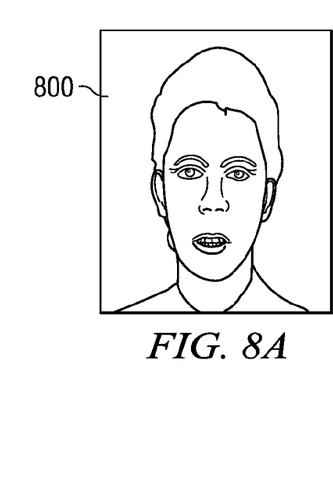
FIGS. 8a-8d show an illustrative modification of a generic model using mesh information, in accordance with embodiments of the invention.
Figure 8B:
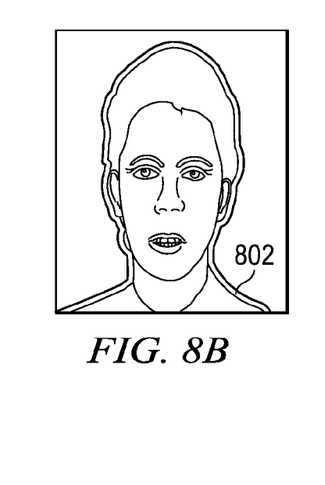
Figure 8C:
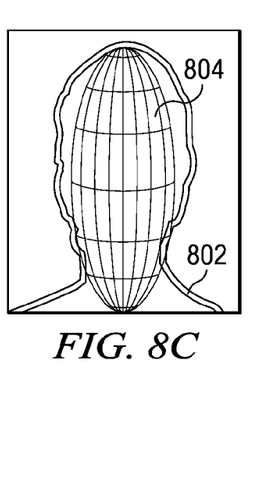
Figure 8D:
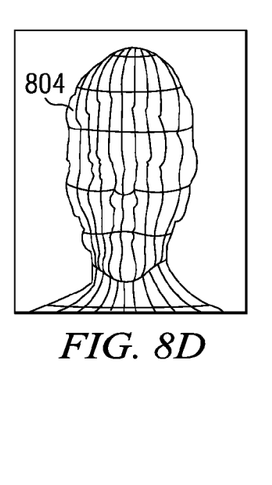

FIGS. 8a-8d show conceptual illustrations of the first phase (the "mesh" phase) described above. FIG. 8a shows a captured image 800 of the user. FIG. 8b shows that the user's silhouette 802 is traced and captured. FIG. 8c shows a generic model 804 against the captured silhouette 802 of the user. FIG. 8d shows that the processing logic 200 modifies the mesh of the generic model 804 to resemble the silhouette of the user. In addition to the modification of the sub-bands 300 which define the silhouette of the generic model 208, the first phase may also include the modification of other sub-bands 300 with other mesh information (e.g., structural features), such as nose shape and prominence, cheekbone prominence and location, etc.

Figure 9A:
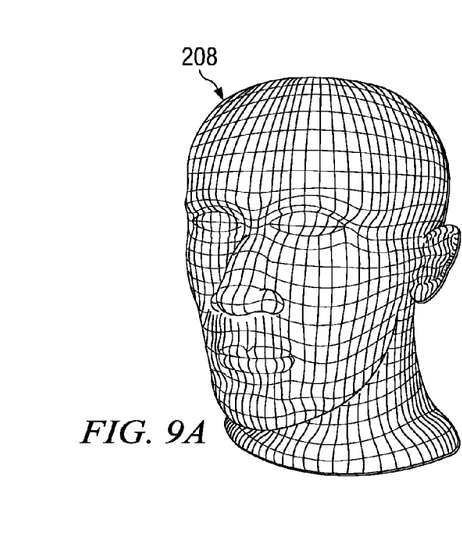
FIGS. 9a-9c show an illustrative modification of a generic model using texture information, in accordance with embodiments of the invention.
Figure 9B:
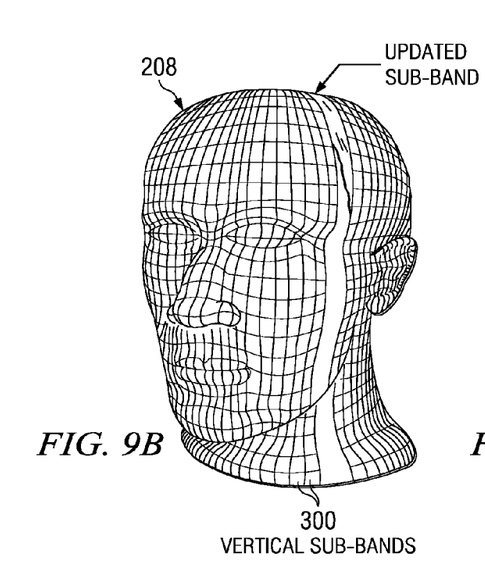
Figure 9C:
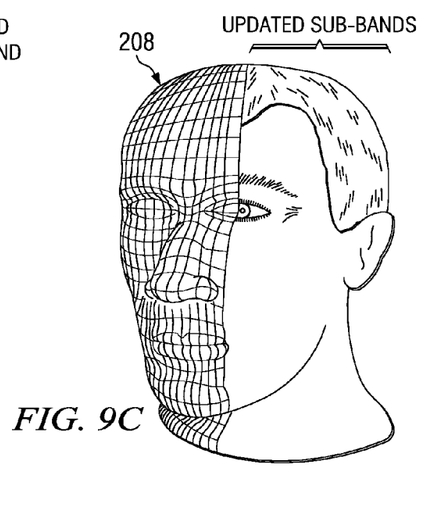

FIGS. 9a-9c show conceptual illustrations of the second phase (the "texture" phase) described above. FIG. 9a shows the generic model 208 prior to adding any texture information from a captured image. FIG. 9b shows the generic model 208 after adding texture information from a captured image to a single vertical sub-band 300. FIG. 9c shows the generic model 208 after adding texture information to multiple, vertical sub-bands 300 which extend from the user's left ear to the middle of the user's left eyebrow. As previously explained, the images of FIGS. 9b and 9c are still referred to as "generic models" for ease of reading, although these images have been modified from the original generic model shown in FIG. 9a.

The iteration described above is repeated as often as desired, but preferably every 33 milliseconds. The iterations are repeated until the processing logic 200 determines that the user has completed the head rotation sequence as previously requested by the processing logic 200 (e.g., by ensuring that the logic 200 has captured images corresponding to each of the positions shown in FIG. 6). When the iterations are complete, the generic model 208 appears substantially similar to the user's head, including mesh information (e.g., structural features such as nose prominence, jaw shape) and texture information (e.g., non-structural features such as hair, color, skin, eyes). The finished generic model 208 then may be used by the processing logic 200 in various applications, such as application 210 (e.g., an avatar in a gaming application).

Figure 10:
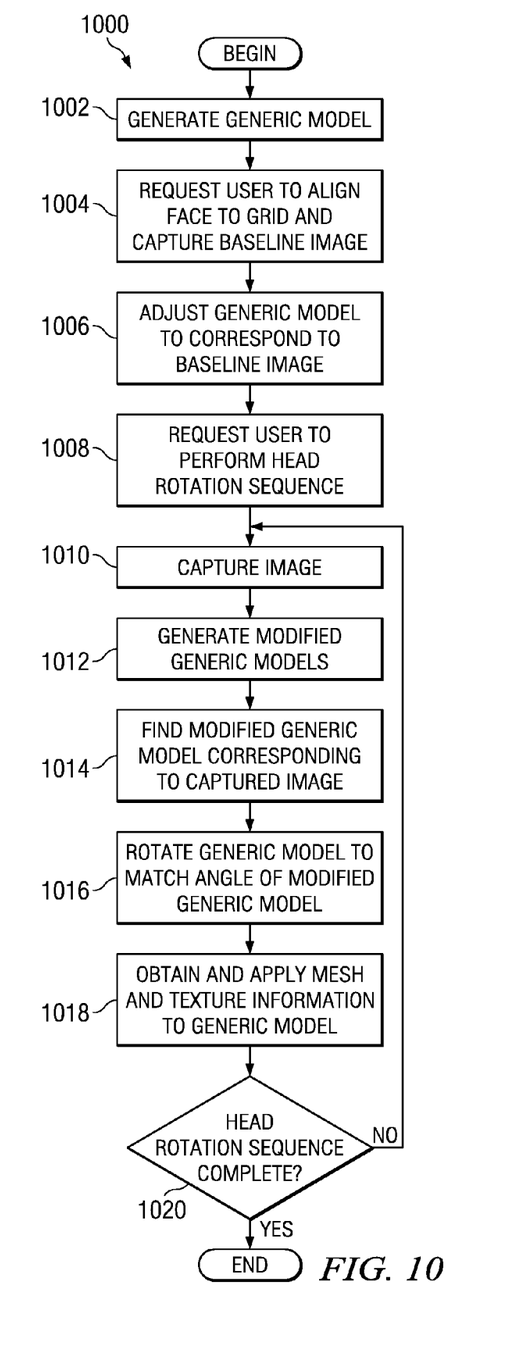
FIG. 10 shows an illustrative flow diagram of a method implemented in accordance with preferred embodiments of the invention.

FIG. 10 shows an illustrative flow diagram of a method 1000 implemented in accordance with embodiments of the technique disclosed herein. The method 1000 begins by generating or otherwise obtaining a generic model (block 1002). As previously described, the generic model obtained is in accordance with the target object (e.g., a human head). The method 1000 continues by requesting the user to align the user's face with the initialization grid and capturing an initial image (block 1004). The method 1000 continues by adjusting the generic model to correspond to the initial image, as described in context of FIGS. 5a-5c (block 1006). The method 1000 continues by requesting the user to perform the head rotation sequence (block 1008). While in preferred embodiments the head rotation sequence is as described in FIG. 6, in some embodiments, the head rotation sequence may include fewer or additional (e.g., rotate head up and down) positions.

The method 1000 continues by capturing an image of the end-user (block 1010). The method 1000 also comprises generating modified generic models (block 1012) as described above. The method 1000 then determines a modified generic model which corresponds to the captured image (block 1014). The method 1000 comprises rotating the generic model to match the angle of the modified generic model which corresponds to the captured image (block 1016). The method 100 also comprises obtaining and applying mesh and texture information from the captured image to the generic mode as described above (block 1018). The method 1000 then comprises determining whether the head rotation sequence is complete (block 1020). If so, the method 1000 ends. If not, the method continues at block 1010 by capturing another image of the end-user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   an imaging device adapted to capture images of a target object at multiple angles;
   storage coupled to the imaging device and adapted to store a generic model of the target object; and
   processing logic coupled to the imaging device and adapted to perform an iterative process by which the generic model is modified in accordance with the target object;
   wherein, during each iteration of the iterative process, the processing logic obtains structural and textural information associated with at least one of said captured images and modifies the generic model with said structural and textural information;
   wherein the processing logic displays the generic model; and
   wherein, during at least some iterations of the iterative process, the processing logic updates a sub-band of the generic model with the textural information and updates a silhouette of the generic model with the structural information.

2. The system of claim 1, wherein the imaging device comprises a device selected from the group consisting of a webcam and a mobile communication device camera.

3. The system of claim 1, wherein said captured images include at least four images, each of said four images associated with different sides of a human head, wherein each of said four images contains at least some graphical representations of human head features not contained by another of the four images.

4. The system of claim 1, wherein the system comprises a device selected from the group consisting of a mobile communication device and a personal computer (PC).

5. The system of claim 1, wherein said imaging device is adapted to capture at least some of said images while a user of the system rotates the user's head from one side to another side, wherein the user is the target object.

6. The system of claim 1, wherein the textural information comprises information selected from the group consisting of flesh information and hair information.

7. The system of claim 1, wherein the structural information comprises information selected from the group consisting of nose information, jaw information, brow information and cheekbone information.

8. The system of claim 1, wherein the processing logic modifies the generic model by adjusting sub-bands of the generic model.

9. The system of claim 1, wherein, before the processing logic modifies the generic model with the structural and textural information, the processing logic rotates the generic model in accordance with an angle at which the target object is positioned.

10. The system of claim 9, wherein the processing logic determines said angle by comparing an image of the target object to a plurality of other images, each of said plurality of other images comprises a copy of the generic model rotated to a different, predetermined angle.

11. The system of claim 1, wherein during the iterations in which the processing logic updates a sub-band of the generic model with textural information, the processing logic modifies only the sub-band that coincides with a midline of the captured image.

12. A process, comprising:
    capturing an image of a target object;
    matching the image to one of a plurality of modified generic models, each of the plurality of modified generic models associated with a common generic model and rotated to a different angle;
    rotating the common generic model to an angle associated with said one of the plurality of modified generic models;
    modifying the common generic model with structural and textural information associated with said image; and
    displaying said common generic model;
    wherein modifying said common generic model comprises adjusting contours of sub-bands associated with the common generic model.

13. The process of claim 12 further comprising:
    rotating the target object;
    capturing a minimum of four images as the target object is rotated;
    as each of the four images is captured, modifying the common generic model with structural and textural information associated with said each of the four images.

14. The process of claim 13, wherein rotating the target object comprises rotating the target object from side to side along a vertical axis.

15. The process of claim 12, wherein said process captures said image, matches said image, rotates the common generic model and modifies the common generic model independent of key point selection by an end-user.

16. The process of claim 12, wherein said process captures said image, matches said image, rotates the common generic model and modifies the common generic model on a real-time basis.

17. The process of claim 12, wherein capturing said image comprises using a device selected from the group consisting of a webcam and a mobile communication device camera.

18. The process of claim 12, wherein modifying said common generic model comprises updating only the sub-band that coincides with a midline of the captured image with the textural information.

19. A system, comprising:
    means for capturing an image of a target object;
    means for matching the image to one of a plurality of modified generic models, each of the plurality of modified generic models associated with a common generic model and rotated to a different angle; and
    means for displaying said common generic model;
    wherein the means for matching is also for rotating the common generic model to an angle associated with said one of the plurality of modified generic models;
    wherein the means for matching is also for modifying the common generic model with structural and textural information associated with said image;
    wherein the means for modifying is also for adjusting contours of sub-bands associated with the common generic model and for updating only the sub-band that coincides with a midline of the captured image with the textural information.

20. The system of claim 19, wherein the system comprises a mobile communication device.

* * * * *